March 14, 1967 A. E. SHECKELLS 3,308,912
REVOLVING DOOR OPERATING MECHANISM AND SPEED CONTROLLER
Filed Jan. 26, 1966 3 Sheets-Sheet 1

INVENTOR.
AMUEL E. SHECKELLS
BY Rupert J. Brady
ATTORNEY.

March 14, 1967   A. E. SHECKELLS   3,308,912
REVOLVING DOOR OPERATING MECHANISM AND SPEED CONTROLLER
Filed Jan. 26, 1966   3 Sheets-Sheet 2
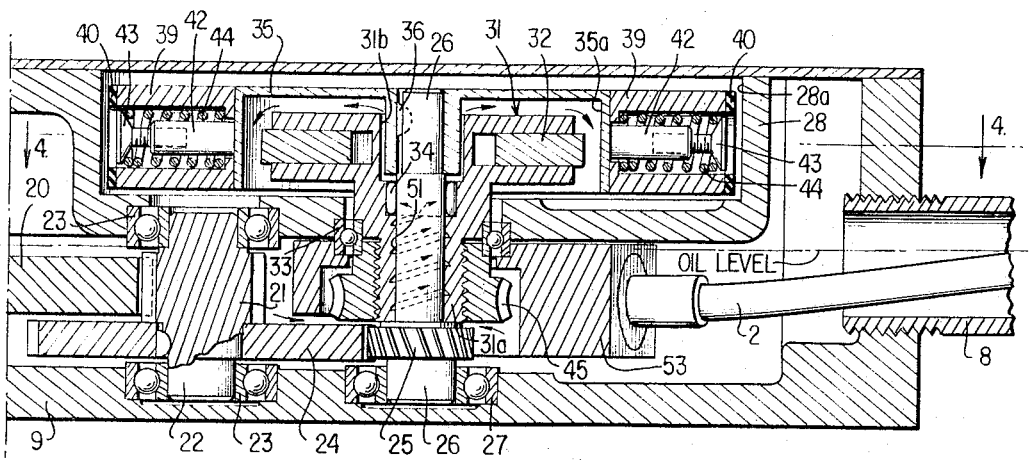
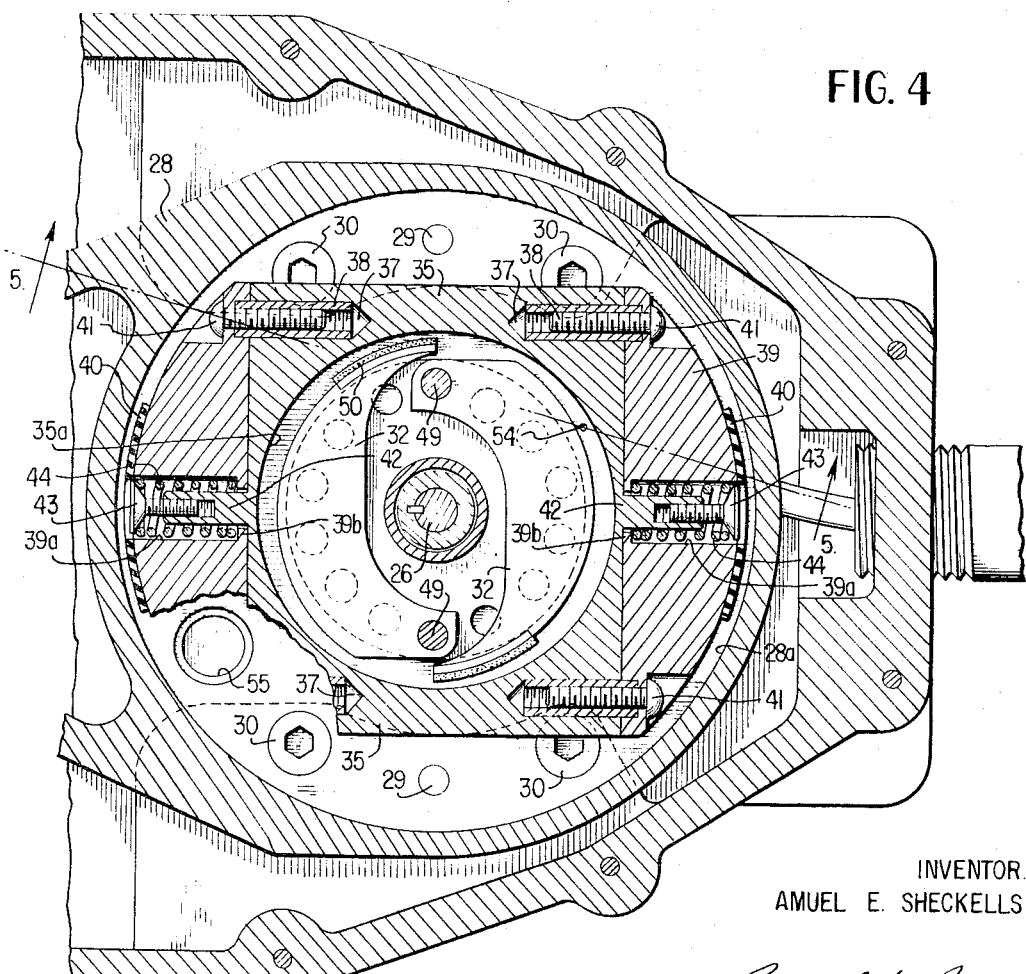
INVENTOR.
AMUEL E. SHECKELLS
BY *Rupert J. Brady*
ATTORNEY March 14, 1967   A. E. SHECKELLS   3,308,912

REVOLVING DOOR OPERATING MECHANISM AND SPEED CONTROLLER

Filed Jan. 26, 1966   3 Sheets-Sheet 3

INVENTOR.
AMUEL E. SHECKELLS

BY  *Rupert L. Brady*
ATTORNEY

United States Patent Office 3,308,912
Patented Mar. 14, 1967

3,308,912
REVOLVING DOOR OPERATING MECHANISM
AND SPEED CONTROLLER
Amuel Edmond Sheckells, Evansville, Ind., assignor to
International Steel Company, Evansville, Ind., a corporation of Indiana
Filed Jan. 26, 1966, Ser. No. 523,222
10 Claims. (Cl. 192—4)

This application is a continuation-in-part of my prior copending application S.N. 382,791, filed July 15, 1964, wherein there is disclosed a revolving door speed control mechanism comprising, essentially, a gear train, having a gear ratio of 100 to 1, positioned within a housing and operatively connected between a shaft of a revolving door and a centrifugal brake assembly; the housing, gear train and brake mechanism being constructed and arranged to form a low profile assembly, whereby the control mechanism can be selectively mounted in either an overhead or floor type revolving door installation; the housing of the speed control mechanism containing a volume of oil which not only provides continuous lubrication of the mechanism but also coacts with the breaking assembly to provide a smooth and dependable braking action.

The invention of the present application relates to an operating mechanism for a revolving door, and more particularly to a motor drive and clutch assembly operatively connected to a speed control mechanism of the type disclosed in my aforementioned copending application, while at the same time, maintaining the low-profile characteristic of the speed control mechanism.

Heretofore, attempts have been made to operate revolving doors by means of a drive motor and clutch assembly. While these mechanisms have been satisfactory for their intended purposes, they have been subject to certain objections. One such objection is the bulkiness of the mechanism caused by the design and structural relationship of the motor, clutch assembly and speed controller. Because of its bulkiness, the mechanism had to be designed specifically for each installation in either the overhead or floor type door installation.

In today's architectural designs for apartment houses, hospitals, restaurants, stores, office buildings, hotels, and the like, the trend is to employ large areas of glass for the building fronts together with relatively thin ceilings and floors. When using revolving doors in the entrances of these buildings, it is necessary that the design of the speed control and operating mechanism be architecturally consistent with the building. Thus, the revolving door operating mechanism of the present invention has been devised to be employed with a relatively thin, low-profile, speed control which is readily adapted to be selectively mounted in overhead installations having a 3 inch thick ceiling or in floor type installations. The door operating mechanism of the present invention comprises, essentially, a small motor operatively connected to the door speed control mechanism by means of a flexible drive shaft and clutch assembly, the clutch assembly being mounted concentrically within the centrifugal brake assembly of the door speed controller.

An object of the invention is to provide an improved low-profile operating mechanism operatively connected to a low-profile speed control mechanism adapted to be selectively mounted in either an overhead or floor type revolving door installation.

Another object of the invention is to provide an improved low-profile operating mechanism for a revolving door wherein a small motor is connected to the door speed control mechanism through a flexible shaft and a clutch assembly.

Still another object of the invention is to provide an improved low-profile operating mechanism for a revolving door having a low-profile speed control mechanism including a centrifugal brake assembly wherein the clutch assembly of the operating mechanism is positioned concentrically within the centrifugal brake assembly.

Yet another object of the invention is to provide an improved low-profile operating mechanism for a revolving door wherein the clutch assembly of the operating mechanism includes a plurality of shoes adjustably mounted on a drive plate whereby the driving torque may be varied.

Yet still another object of the invention is to provide an improved low-profile operating mechanism for a revolving door wherein pump means are operatively connected to the operating mechanism for supplying a volume of oil to the clutch assembly of the operating mechanism and to the brake assembly of the door speed control mechanism.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 3 is an enlarged, side elevational, sectional view of the door operating and speed control mechanisms of the present invention;

FIGURE 4 is a view taken along line 4—4 of FIGURE 3;

Figure 1:
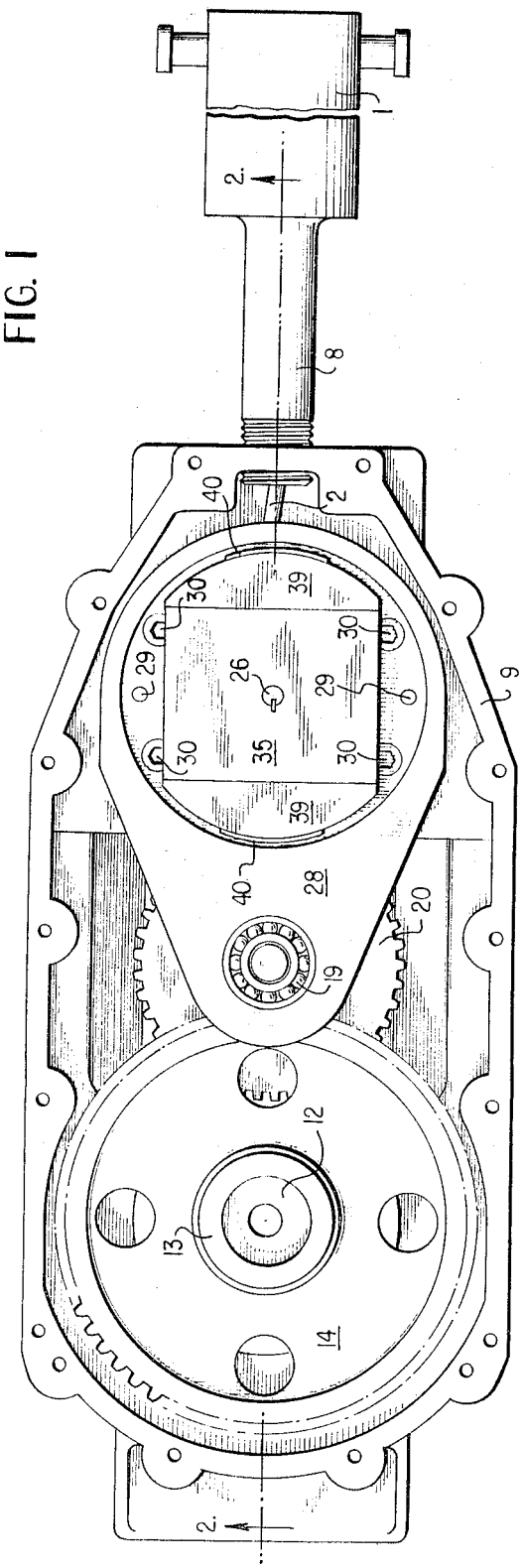
FIGURE 1 is a top plan view of the improved revolving door operating mechanism and speed control assembly with the cover plate removed therefrom.
Figure 2:
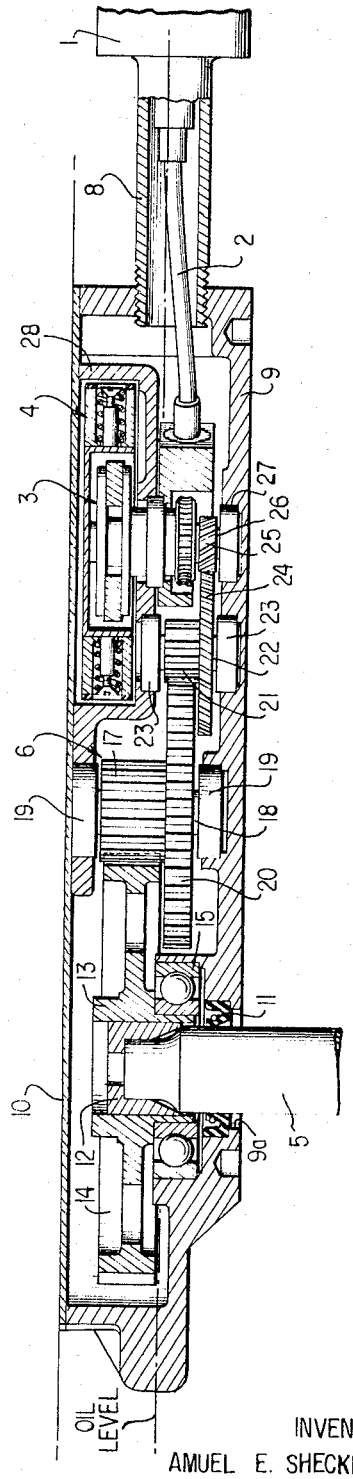
FIGURE 2 is a sectional view taken along line 2—2 of FIGURE 1 showing the door operating mechanism and speed control assembly mounted in an overhead type revolving door installation.

Referring to the drawings, and more particularly to FIGURES 1 and 2, the low profile operating mechanism and speed control assembly of the present invention comprises a motor 1 having a flexible drive shaft 2 operatively connected to a clutch assembly 3 positioned concentrically within a centrifugal brake assembly 4 which is operatively connected to a revolving door shaft 5 by means of a gear train 6. The flexible drive shaft 2 is enclosed by a tubular housing 8 having one end connected to the motor housing and the opposite end threadably secured within an aperture formed in an integral, cast housing 9 in which the clutch and brake assemblies, and gear train are positioned, and enclosed therein by means of a cover plate 10.

An overhead-type revolving door installation is illustrated in FIGURE 2, wherein the upper end of the door shaft 5 extends through a sealing member 11 positioned within an opening 9a formed in the bottom wall of housing 9, the end of the door shaft being threadably secured to a key member 12 which is splined to the hub 13 of the gear train main gear 14, which is rotatably mounted within the housing by means of an anti-friction bearing 15. The main gear meshes with a pinion 17 carried by a shaft 18 which is rotatably mounted within the housing by means of bearings 19. An intermediate gear 20 is also carried by shaft 18 and meshes with a pinion 21 carried by a second shaft 22 which is rotatably mounted within the housing by means of bearings 23. A helical gear 24 is carried by shaft 22 and meshes with a smaller helical gear 25 secured to the centrifugal brake assembly shaft 26 which is rotatably mounted within the housing by means of bearing 27.

Referring to FIGURES 3 and 4, the centrifugal brake assembly comprising a housing 28 positioned within housing 9 by means of dowel pins 29 and secured thereto by suitable bolts 30. A clutch drive plate 31 having clutch shoes 32, to be described more fully hereinafter, is provided with an integral shank portion 31a which extends through the bottom wall of housing 28 and is rotatably mounted therein by means of anti-friction bearing 33. The centrifugal brake assembly shaft 26 extends upwardly through the clutch drive plate shank portion and is journaled therein by means of needle bearing 34, the upper end portion of the shaft having a brake driver block 35 keyed thereto as at 36. The clutch drive plate is provided with a recess 31b which accommodates not only the upper end portion of shaft 26 but also the depending hub 35b of the brake driver block. By this construction and arrangement, the clutch mechanism is positioned concentrically within the centrifugal brake assembly, whereby the low-profile characteristic of the speed control mechanism is maintained. As will be seen in FIGURE 4, the brake driver block is substantially square in cross-section and has four bores 37 drilled in the sides thereof adjacent the block corners, each of the bores being provided with a tubular member 38 slidably mounted therein. An arcuate brake shoe 39 having a brake band 40 is secured to each pair of tubular members through bolts 41 extending into the tubular members. Each side of the brake driver block is provided with a stem 42 positioned intermediate the bores 37 and extending outwardly from the side of the block into a recess 39a formed in the brake shoe. A bolt 43 is threaded into the stem 42 and a coil spring 44 is positioned between the bolt head and a shoulder 39b provided on the closed end of recess 39a, whereby the biasing force of the springs urges the brake shoes radially inwardly toward the brake driver block.

By the construction and arrangement of the centrifugal brake assembly, the centrifugal force produced by rotation of the brake driver block 35 causes brake shoes 39 to slide radially outwardly, whereby the brake bands 40 engage the inner peripheral wall 28a of the brake housing 28 to thereby control the speed of the mechanism. As the brake shoes move radially outwardly, springs 44 are compressed so that when the brake driver block stops rotating the springs expand, thereby biasing the brake shoes inwardly to their normal position as shown in FIGURES 3 and 4.

Figure 6:
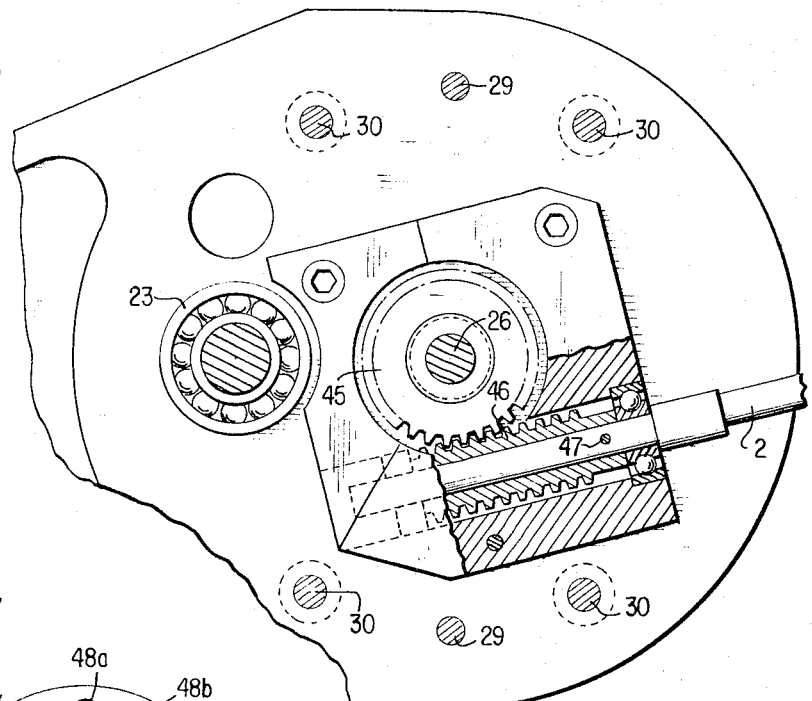
FIGURE 6 is a bottom plan view, partially in section, of the door operating and speed control mechanisms illustrated in FIGURE 3.

As will be seen in FIGURES 3 and 6, the lower end of the clutch drive plate shank has a worm gear 45 secured thereto which meshes with a worm gear 46 secured to the end of the flexible drive shaft by means of a pin 47, whereby when motor 1 is energized, shaft 2 causes worm gear 46 to rotate which in turn rotates worm gear 45 and its associated clutch drive plate 31.

Figure 7:
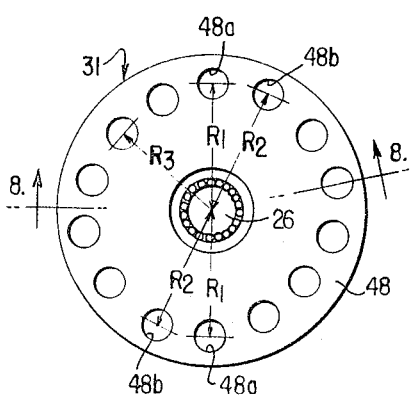
FIGURE 7 is a top plan view of the drive plate employed in the clutch assembly of the door operating mechanism of the present invention.
Figure 8:
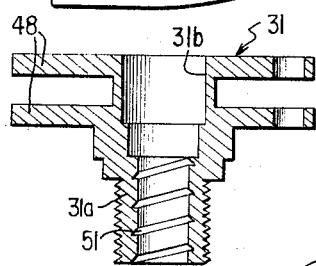
FIGURE 8 is a side elevational, sectional view of the clutch drive plate illustrated in FIG. 7.

Reference being had to FIGURES 4, 7 and 8, the clutch drive plate comprises a pair of vertically spaced flanges 48 between which the clutch shoes 32 are positioned and pivotally mounted thereon by means of pins 49 extending through one end of the clutch shoes, the opposite end of the clutch shoes carrying an arcuate clutch band 50 adapted to engage the inner peripheral wall 35a of the brake driver block 35. By the construction of the clutch assembly, it will be readily apparent that the clutch drive plate is adapted to be rotated relative to the shaft 26, until the centrifugal force generated thereby causes the clutch shoes 32 to pivot radially outwardly causing the clutch bands 50 to engage the peripheral wall 35a of the brake driver block, whereby the brake driver block, shaft 26, and associated helical gear 25 rotate to thereby rotate gear train 6 and revolving door shaft 5.

As will be seen in FIGURE 7, pairs of apertures 48a, 48b, etc., provided in the flanges 48 through which the clutch shoe pins 49 extend, are positioned at different radii; viz., $R_1$, $R_2$, from the center of rotation of shaft 26 and associated gear 25. By this construction and arrangement, the clutch shoe pins can be selectively positioned in a desired pair of apertures to obtain a predetermined torque on the gear 25; thus, the further the clutch pins are moved radially from the center of rotation of shaft 26, the lower will be the driving torque on gear 25.

Figure 5:
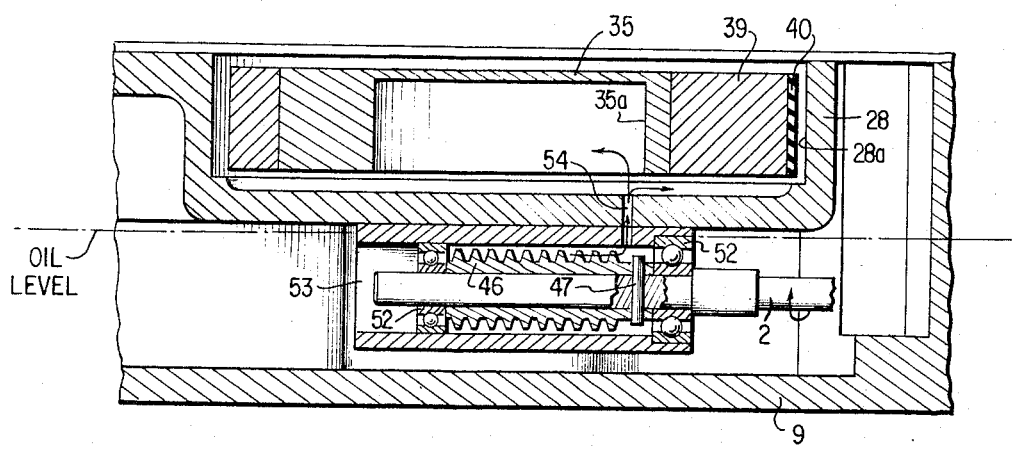
FIGURE 5 is a view taken along line 5—5 of FIGURE 4, with certain parts removed for purposes of clarity.

In order to provide continuous lubrication and to enhance the smooth operation of the door speed control mechanism and clutch assembly, the housing 9 is provided with a volume of oil the level of which is indicated by dashed lines in FIGURES 2, 3 and 5. The oil is fed from the housing 9 into the centrifugal brake assembly housing 28 by means of a helical oil groove 51 formed in the internal wall of the clutch drive plate shank 31a (FIGURE 8); thus, as the clutch drive plate 31 and shaft 26 are rotated relative to each other, oil will be pumped, as indicated by the arrows in FIGURE 3, into the brake and clutch assembly housing 28, in a manner similar to that disclosed in the aforementioned pending application. The helical oil groove is designed to be $\frac{1}{16}''$ deep x 45° with a lead of 5½ turns per inch and while the groove has been illustrated as being formed in the internal wall of the shank, it will be understood to those skilled in the art that, in lieu thereof, the groove could be formed on the peripheral surface of the shaft 26.

The shaft 26 will rotate with respect to the clutch drive plate 31 if the motor is de-energized and the revolving door is manually actuated; thus, the clutch drive plate will be stationary while the shaft 26 is rotated to actuate the centrifugal brake assembly to control the rotational speed of the door.

The relative rotation of the clutch drive plate 31 with respect to the shaft 26 will take place if the shaft remains stationary and the motor is energized to thereby rotate the clutch plate through gear 45. In this instance, the centrifugal force generated by rotation of the clutch plate is insufficient to cause the clutch shoes 32 to swing outwardly to engage the inner peripheral wall 35a of the brake driver block. However, when the rotation of the clutch drive plate is increased to actuate the clutch shoes to thereby cause rotation of the brake driver block, the shaft 26 and clutch drive plate 31 will rotate together at the same r.p.m. In this instance, there will be no relative rotation between the shaft and the clutch drive plate; therefore, no oil will be pumped into the brake housing by the helical groove 51.

In order that oil may be supplied to the clutch and brake housing 28 under all operating conditions of the revolving door, and particularly under the condition noted above wherein no oil is being pumped into the housing by groove 51; that is, when shaft 26 and clutch drive plate 31 are rotating at the same r.p.m., a second pump is provided by means of the worm gear 46 (FIGURE 5) connected to the end of the flexible drive shaft 2 which is rotatably mounted by means of anti-friction bearings 52 within a bearing block 53 secured to the bottom wall of the clutch-brake housing 28. An aperture 54 is formed through the wall of the bearing block and bottom wall of the clutch-brake housing 28 to provide a conduit for the flow of oil into the clutch-brake housing, a drain hole 55 (FIGURE 4) also being formed in the bottom wall of the clutch-brake housing to allow for the gravitational flow of oil from the clutch-brake housing back into the housing 9.

In the normal operation of the revolving door operating mechanism and speed controller, a person desiring to pass through an entranceway, within which the revolving door is mounted, enters the door enclosure in the usual manner, and by pushing on the revolving door closes a suitable switch means connected in an electrical circuit to energize the motor 1 to thereby drive the clutch assembly 3 which in turn rotates the centrifugal brake assembly 4, shaft 26, gear train 6 and revolving door shaft 5.

As the worm gear 46 rotates to drive the clutch assembly, it simultaneously pumps oil from housing 9 into the clutch-brake housing 28, wherein the oil impinges upon the brake driver block 35 and brake shoes 39 with the result that the centrifugal force of the rotating members causes the oil to be flung outwardly, thereby forming a thin film of oil on the inner peripheral walls 28a and 35a of the brake housing and brake driver block, respectively, whereby lubricated surfaces are provided on the respective peripheral walls engaged by the brake and clutch bands to thereby preclude the grabbing of the brake bands against the wall, and to allow the brake driver block to rotate relative to the clutch assembly during manual operation of the revolving door. Furthermore, if any article or any portion of the body of a user should become caught between a door wing and the revolving door enclosure, no injury or damage will be caused due to the fact that the lubricated peripheral wall 35a allows the clutch bands to slip thereon while the motor, flexible shaft and clutch drive plate continue to rotate. In this connection, the clutch bands 50 are designed to contact the peripheral wall 35a at a predetermined angle so that when the clutch bands slip thereon, the clutch shoes are pushed slightly radially inwardly to thereby move the clutch bands out of driving engagement with the brake driver block.

The motor employed in the operating mechanism of the present invention is a 2¼″ diameter, .22 H.P., D.C. motor and, through suitable electrical control means, is adapted to be energized through an operating range of 0 to 8 r.p.m. of the revolving door shaft. For instance, the motor can be energized to rotate from 0 r.p.m. to a selected high speed, then to a selected lower speed and back to 0 r.p.m. to stop the door at a predetermined position, or, if desired, sufficient voltage can be fed to the motor to maintain a slight torque on the revolving door shaft while maintaining the door at 0 r.p.m. until being used, whereupon, the voltage to the motor is increased causing the motor to rotate at a higher speed to increase the torque of the revolving door shaft, thereby rotating the door.

From the above description, it will be readily apparent that by employing a small motor, and by mounting the clutch assembly concentrically within the centrifugal brake assembly, a low-profile revolving door operating mechanism and speed controller are provided having dimensions in height, width and length that permit installation within a 3″ ceiling which provides a more desirable line of slight than heretofore provided in overhead-type controls, and, it should be understood that the housing 9 is adapted to be provided with shock absorbers, or wheels, of the type disclosed in my aforementioned copending application, whereby the door wings and housing are adapted to be moved to one side to provide a larger access opening in the entranceway.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:
1. A revolving door operating mechanism and speed control device of the character described comprising, a housing, a main gear rotatably mounted within said housing, said main gear being adapted to be secured to the revolving door shaft, centrifugal brake means positioned within the housing, gear train means rotatably mounted within the housing, said gear train means being operatively connected between the main gear and the centrifugal brake means, a clutch assembly mounted concentrically within said centrifugal brake means, and motor means operatively connected to said clutch assembly, whereby upon energization of said motor means, the clutch assembly is rotated to cause rotation of said centrifugal brake means while simultaneously rotating the revolving door shaft through the gear train; said main gear, gear train means, centrifugal brake means and clutch assembly, all being positioned within said housing in spaced, parallel, closely adjacent horizontal planes to thereby form a low-profile operating mechanism and speed control device adapted for selective installation in either an overhead or floor-type revolving door installation.

2. A revolving door operating mechanism and speed control device according to claim 1, wherein the clutch assembly comprises a brake driver block having an inner peripheral wall, a clutch plate rotatably mounted within said brake driver block, and a plurality of clutch shoes pivotally connected to said clutch plate, whereby upon rotation of said clutch plate the centrifugal force generated thereby causes the clutch shoes to pivot radially outwardly to engage the peripheral wall of the brake driver block to thereby cause rotation of said brake driver block.

3. A revolving door operating mechanism and speed control device according to claim 2, wherein each clutch shoe is pivotally connected to the clutch plate by means of a pin extending through said clutch shoe and a respective aperture formed in the clutch plate, said apertures being positioned at different radii from the center of rotation of the clutch plate, whereby a predetermined torque on the brake driver block can be obtained.

4. A revolving door operating mechanism and speed control device according to claim 2, wherein a shaft is rotatably mounted within the clutch plate, one end of said shaft being connected to said brake driver block, the opposite end of said shaft being connected to said gear train means.

5. A revolving door operating mechanism and speed control device according to claim 4, wherein a second housing is mounted within the first-mentioned housing, the centrifugal brake means and clutch assembly being positioned within said second housing, a volume of oil contained within said first-mentioned housing, and pump means for feeding oil from the first housing into said second housing.

6. A revolving door operating mechanism and speed control device according to claim 5, wherein a plurality of brake shoes are slidably mounted on the brake driver block, whereby, upon rotation of the brake driver block, the centrifugal force generated thereby causes the brake shoes to slide radially outwardly to engage the inner peripheral wall of said second housing to thereby govern the speed of rotation of the revolving door.

7. A revolving door operating mechanism and speed control device according to claim 6, wherein said pump means comprises, a tubular shank portion formed on the clutch plate, said shaft extending within said shank portion, the peripheral surface of the shaft engaging the inner wall of said tubular shank portion, and a helical groove formed on the inner wall of the shank portion, whereby when the shaft and clutch plate rotate relative to each other, oil is pumped into the second housing to thereby coat the inner peripheral walls of the brake driver block and said second housing with a thin film of oil.

8. A revolving door operating mechanism and speed control device according to claim 5, wherein the motor means for driving the clutch plate comprises, a motor, gear means connected to said clutch plate, and a drive shaft connected between said motor and said gear means.

9. A revolving door operating mechanism and speed control device according to claim 8, wherein the pump means comprises a worm gear included within said gear means, whereby upon rotation of said drive shaft the worm gear feeds oil into the second housing.

10. A revolving door operating mechanism and speed control device according to claim 1, wherein a volume of oil is contained within said housing, and pump means mounted within said housing for feeding oil to the clutch and centrifugal brake assemblies.

References Cited by the Examiner
UNITED STATES PATENTS

| | | | |
|---|---|---|---|
| 1,732,902 | 10/1929 | Lowther | 49—43 |
| 2,128,531 | 8/1938 | Hagenbook | 49—43 |
| 2,267,632 | 12/1941 | Wunsch | 49—43 |

DAVID J. WILLIAMOWSKY, *Primary Examiner.*

A. T. McKEON, *Assistant Examiner.*